(12) United States Patent
Herzinger (10) Patent No.: US 10,606,093 B1
(45) Date of Patent: *Mar. 31, 2020

(54) BIASED FAST AXIS RETARDER SYSTEM (71) Applicant: J.A. WOOLLAM CO., INC., Lincoln, NE (US)

(72) Inventor: Craig M. Herzinger, Lincoln, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/932,578

(22) Filed: Mar. 16, 2018

Related U.S. Application Data (63) Continuation-in-part of application No. 15/731,314, filed on May 23, 2017, now Pat. No. 9,921,352.

(60) Provisional application No. 62/392,435, filed on Jun. 1, 2016.

(51) Int. Cl.
*G02B 5/30* (2006.01)
*G02B 27/28* (2006.01)

(52) U.S. Cl.
CPC ........... *G02B 27/28* (2013.01); *G02B 5/3083* (2013.01)

(58) Field of Classification Search
CPC .............................. G02B 5/3083; G02B 27/28
USPC .................................................... 359/489.07
See application file for complete search history.

(56) References Cited

U.S. PATENT DOCUMENTS

| | | | | |
|---|---|---|---|---|
| 3,630,597 A | * | 12/1971 | Hulme | G02F 1/03 359/250 |
| 5,473,465 A | * | 12/1995 | Ye | G02B 5/3083 359/246 |
| 5,743,473 A | * | 4/1998 | Gregg | B02C 19/0068 241/100 |
| 5,946,098 A | * | 8/1999 | Johs | G01J 4/00 356/364 |
| 6,084,674 A | * | 7/2000 | Johs | G02B 5/3083 356/327 |
| 6,100,981 A | * | 8/2000 | Johs | G01J 4/00 356/364 |
| 6,118,537 A | * | 9/2000 | Johs | G02B 5/3083 356/364 |
| 6,141,102 A | * | 10/2000 | Johs | G01J 4/00 356/364 |
| 6,373,614 B1 | * | 4/2002 | Miller | G01J 1/26 250/201.1 |
| 6,970,241 B1 | * | 11/2005 | DeSa | G01N 21/6445 356/317 |
| 9,921,352 B1 | * | 3/2018 | Herzinger | G02B 5/3083 |
| 2013/0335823 A1 | * | 12/2013 | Epstein | G02B 5/3041 359/489.07 |

* cited by examiner

*Primary Examiner* — Ricky D Shafer
(74) *Attorney, Agent, or Firm* — James D. Welch (57) ABSTRACT

A retarder that comprises at least two plates, each of which comprise two surfaces that are parallel to, or substantially parallel to one another, said plates being tipped with respect to one another so that the surfaces of one thereof are not parallel to the surfaces of the other, each said plate further comprising a biased fast axis that is neither parallel to, or perpendicular to surfaces of said plates.

19 Claims, 4 Drawing Sheets

BIASED FAST AXIS RETARDER SYSTEM

This Application is a CIP of application Ser. No. 15/731,314 Filed May 23, 2017, and there via Claim Benefit of Provisional Application No. 62/392,435 Filed Jun. 1, 2016.

TECHNICAL FILED

The present invention relates to systems for entering phase delay between orthogonal components of a polarized beam of electromagnetic radiation, and more particularly to a retarder system that comprises at least two plates, each of which comprise two surfaces that are parallel to, or substantially parallel to one another, said plates being tipped with respect to one another so that the surfaces of one thereof are not parallel to the surfaces of the other, at least one said plate further comprising a biased fast axis that is neither parallel to, or perpendicular to surfaces of said plates.

BACKGROUND

It is well known to apply Berek-type, and Non-Berek-type Plate retarders to enter phase delays between orthogonal components of a polarized beam of electromagnetism caused to pass therethrough, where Berek-type retarders are characterized by a Fast Axis thereof being ideally oriented perpendicular to surfaces of said Plates, and Non-Berek-type retarders are characterized by a Fast Axis being ideally oriented parallel to said surfaces. Often in the prior art two Berek-type Plates are tipped with respect to one another such that an incident beam of electromagnetic radiation enters the first side of a first plate and is refracted thereby so that it exits the second side thereof at a location offset from the incident beam, which beam exiting the second side of said first Plate then passes through the second Plate in a similar manner, where it is refracted such that the beam exiting from the second side thereof is essentially non-deviated and not offset from the original incident beam that entered the first side of said first Plate. However, the phase angle between the orthogonal components of said electromagnetic beam entering the first side of the first Plate, is changed by passing through the system of two tipped Berek-type Plates. And often as well, two Non-Berek-type Plates are positioned with respect to one another such the surfaces thereof are substantially parallel to one another, and Fast Axes thereof are rotated about an axis that passes perpendicularly through said Plate surfaces. Again the beam exiting from the second side of a second plate in the succession of Plates is essentially non-deviated and not offset from the original incident beam that entered the first side of said first Plate. And, again, the phase angle between the orthogonal components of said electromagnetic beam entering the first side of the first Plate, is changed by passing through the system of at least two Non-Berek-type Plates which are rotated with respect to one another such that their Fast Axes are not in-line with one another.

The use of only multiple sequential Berek or Non-Berek-type retarders exclusively is conventional and is outside the scope of the present invention. The present invention however, while still involving use of at least two Plates in succession, said Plates each having two surfaces that are parallel to or substantially parallel to one another, differs in that in at least one, (preferably all) Plates present the Fast Axis is neither Perpendicular nor Parallel to said parallel or substantially parallel surfaces. Instead the Fast Axis of at least one Plate is at what is termed herein as a "Biased angle" which is an angle between 0.0 and +/−90 degrees, (excluding of course 0.0 and 90 degrees per se.), as related to the surfaces of and Fat Axis of Berek-type Plates.

A particularly relevant Patent is that to Herzinger et al., U.S. Pat. No. 5,835,222. This Patent teaches how to determine the orientation of a Fast Axis in a Retarder Plate.

A problem the present invention addresses is that in conventional Retarders constructed from purely Berek or Non-Berek-type Plates are limited as to the range over which they can provide significant retardance between orthogonal components of an electromagnetic beam. A need remains for a Retarder that can, for instance, provide significant retardance over a range of about 0.3 to 3.0+ microns.

DISCLOSURE OF THE INVENTION

The present invention is a retarder comprising sequentially at least one pair of plates, each said plate having first and second parallel or substantially parallel sides, said plates within a pair thereof being tipped with respect to one another such that an incident beam of electromagnetic radiation entering the first side of the first plate in said pair is refracted thereby so that it exits the second side of said first plate at a location offset from the incident beam, which beam exiting the second side of said first plate then enters the first side of the second plate wherein it is refracted such that the beam exiting from the second side of said second plate is essentially non-deviated and not offset from the original incident beam that entered the first side of said first Plate, said retarder being characterized in that the fast axis of each is neither perpendicular to nor parallel to said parallel or substantially parallel plate surfaces in said first and second plates, but rather is at a biased angle therebetween.

In use a phase angle between orthogonal components of said electromagnetic beam entering the first side of the first Plate, is changed by passing through at least one pair of plates, none of said plates being of a Berek-type or non-Berek-type having a fast axis perpendicular or substantially perpendicular to, or parallel or substantially parallel to the sides of a plate, respectively.

Said retarder can involve that there are two pairs of plates sequentially encountered by said beam of electromagnetic radiation.

Said retarder can involve that the first and second plates in each of the first pair of plates and the second pair of plates are each tipped with respect to one another at the same angle and that the beam exiting from the second side of the second plate in the second pair of plates is essentially non-deviated and not offset from the original incident beam that entered the first side of the first plate in the first pair of plates and the angle of incidence of the original beam to the first side of the first plate in the first pair of plates is the same as the angle of incidence of the beam exiting the second plate in the first pair of plates to the first side of the first plate in the second pair of plates.

Said retarder can involve that the first and second plates in each of the first pair of plates and the second pair of plates are each tipped with respect to one another at different angles, and wherein the beam exiting from the second side of the second plate in the second pair of plates is essentially non-deviated and not offset from the original incident beam that entered the first side of the first plate in the first pair of plates and the angle of incidence of the original beam to the first side of the first plate in the first pair of plates is different from the angle of incidence of the beam exiting the second plate in the first pair of plates to the first side of the first plate in the second pair of plates.

The present invention can involve that the entire retarder system is rotating about the locus of the input beam to the first side of the first plate in the first of said at least one pair of plates.

An alternative present invention retarder comprises sequentially at least one pair of plates, each said plate having first and second parallel or substantially parallel sides, said plates within a pair thereof being tipped with respect to one another such that an incident beam of electromagnetic radiation entering the first side of the first plate in said pair is refracted thereby so that it exits the second side of said first plate at a location offset from the incident beam, which beam exiting the second side of said first plate then enters the first side of the second plate wherein it is refracted such that the beam exiting from the second side of said second plate is essentially non-deviated and not offset from the original incident beam that entered the first side of said first Plate, said retarder being characterized in that the fast axis of at least one said plate is neither perpendicular to nor parallel to said parallel or substantially parallel plate surfaces in said first and second plates, but rather is at a biased angle therebetween.

In use a phase angle between orthogonal components of said electromagnetic beam entering the first side of the first Plate, is changed by passing through said at least one pair of plates, at least one said plates not being of a Berek-type or non-Berek-type having a fast axis perpendicular or substantially perpendicular to, or parallel or substantially parallel to the sides of a plate, respectively.

Said alternative retarder can involve that there are two pairs of plates sequentially encountered by said beam of electromagnetic radiation.

Said retarder can involve that the first and second plates in each of the first pair of plates and the second pair of plates are each tipped with respect to one another at the same angle and wherein the beam exiting from the second side of the second plate in the second pair of plates is essentially non-deviated and not offset from the original incident beam that entered the first side of the first plate in the first pair of plates and the angle of incidence of the original beam to the first side of the first plate in the first pair of plates is the same as the angle of incidence of the beam exiting the second plate in the first pair of plates to the first side of the first plate in the second pair of plates.

Said alternative retarder can involve that the first and second plates in each of the first pair of plates and the second pair of plates are each tipped with respect to one another at different angles, and wherein the beam exiting from the second side of the second plate in the second pair of plates is essentially non-deviated and not offset from the original incident beam that entered the first side of the first plate in the first pair of plates and the angle of incidence of the original beam to the first side of the first plate in the first pair of plates is different from the angle of incidence of the beam exiting the second plate in the first pair of plates to the first side of the first plate in the second pair of plates.

The present invention can involve that the entire alternative retarder system is rotating about the locus of the input beam to the first side of the first plate in the first of said at least one pair of plates.

The foregoing disclosure was originally found in Parent application Ser. No. 15/731,314 Filed May 23, 2017. The following is new disclosure in this CIP Application.

In broad terms, the resent Invention comprises a retarder plate having first and second parallel or substantially parallel sides, said retarder plate not being Berek or non-Berek type in that it has a fast axis which is neither parallel or perpendicular to said first and second sides, but rather is at a biased angle therebetween.

In more detail, the Present Application is retarder system comprising sequentially, at least one pair of plates, each said plate having first and second parallel or substantially parallel sides, said plates being oriented with respect to one another such that an incident beam of electromagnetic radiation entering the first side of the first plate exits the second side of said last plate along a trajectory that is essentially non-deviated and not offset from the original incident beam that entered the first side of said first Plate. Said retarder system is characterized in that at least one plate thereof is neither Berek or non-Berek type in that the fast axis of said at least one of said plates is neither perpendicular to, nor parallel to said plate sides, but rather is at a biased angle therebetween. In use a phase angle between orthogonal components of said electromagnetic beam entering the first side of the first plate, is changed by passing through said at least one pair of plates.

A preferred embodiment provides that there are sequentially two pairs of plates.

One embodiment involves that the plates each have similarly defined reference axes, and in which, as viewed along the path of the beam, the reference axes of the first pair of plates and the second pair of plates are lined up. Another embodiment provides that the plates each have similarly defined reference axes, and in which, as viewed along the path of the beam, the reference axes of the second pair of plates is rotated around the trajectory of said beam, with respect to the reference axes of the first pair of plates by a rotational angle, wherein the rotational angle is between zero and ninety degrees with a preferred case wherein the rotational angle is ninety degrees.

A Present Invention system can involve that the retarder system wherein the two plates of a first pair of plates are oriented one with its first and second parallel or substantially parallel sides at a first set angle with resect to the trajectory of the beam, and the other at a supplementary set angle of (180 degrees—said first set angle) with resect to the trajectory of the beam, respectively; and wherein the two plates of the second pair of plates are oriented one with its first and second parallel or substantially parallel sides at a second set angle with resect to the trajectory of the beam, and the other at a supplementary angle of (180 degrees—said second set angle) with resect to the trajectory of the beam, respectively. A preferred retarder system provides that the first and second set angles are the same.

Another Present Invention provides that retarder system provides that the two plates of each of first and second pairs of plates are oriented with their first and second parallel or substantially parallel sides, parallel, or substantially parallel to one another, and wherein the two plates of the first pair of plates are oriented with respect to the trajectory of the beam at a set angle, and the two plates of the second pair of plates are oriented with respect to the trajectory of the beam at a supplementary angle of (180 degrees—said set angle).

It is also noted that a Present Invention retarder system can provide that two plates in a pair thereof each have similarly defined Diametric-like axes (DA) assigned thereto, and one of said plates is rotated thereabout by a selected number of degrees in a clockwise direction, and the other thereof is rotated thereabout by said selected number of degrees in a counter-clockwise direction.

The present invention can involve any combination of the Present Invention retarder system Plate tips and/or rotations if, in use, rotating about the locus of the input beam to the first side of the first plate in the first of said at least one pair of plates produces an exit beam from the last side of the last Plate which is not deviated or offset from the trajectory of the input beam, and a change in retardation is achieved therein compared to the Input Beam.

A method of providing a retardance to a beam of electromagnetic radiation over a range of wavelengths comprises the steps of:

a) providing a retarder system comprising sequentially, at least one pair of plates, each said plate having first and second parallel or substantially parallel sides, said plates being oriented with respect to one another such that an incident beam of electromagnetic radiation entering the first side of the first plate exits the second side of said last plate along a trajectory that is essentially non-deviated and not offset from the original incident beam that entered the first side of said first plate, said retarder system being characterized in that at least one plate thereof is neither Berek or non-Berek type in that the fast axis of said at least one of said plates is neither perpendicular to, nor parallel to said plate sides, but rather is at a biased angle therebetween.

The method continues with:

b) entering a beam of electromagnetic radiation into the first side of the first plate;

c) monitoring the beam of electromagnetic radiation exiting the second side of the last Plate;

the result being that, in use, a phase angle between orthogonal components of said electromagnetic beam entering the first side of the first plate, is changed by passing through said at least one pair of plates.

The present invention will be better understood by reference to the Detailed Description Section of this Specification in combination with the Drawings.

BRIEF DESCRIPTION OF THE DRAWINGS

FIG. 11A' demonstrates the Plates (P1') and (P2') in FIG. 11A can be rotated about the shown Beam of Electromagnetic Radiation.

FIG. 11A" demonstrates that Diametric-like axes (DA) can be similarly assigned to Plates (P1') and (P2'), and one thereof rotated clockwise and the other counter-clockwise thereabout.

DETAILED DESCRIPTION

FIGS. 1-10 were subject in Allowed Parent application Ser. No. 15/731,314, and are retained herein for insight. The new disclosure in this Application is found in FIGS. 11A-12.

Figure 1:
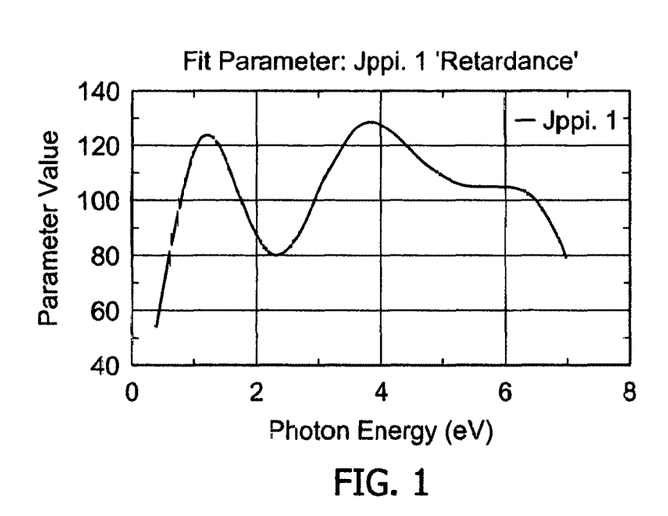
FIG. 1 shows a plot of Retardance vs. Photon Energy provided by a present invention retarder system.
Figure 2:
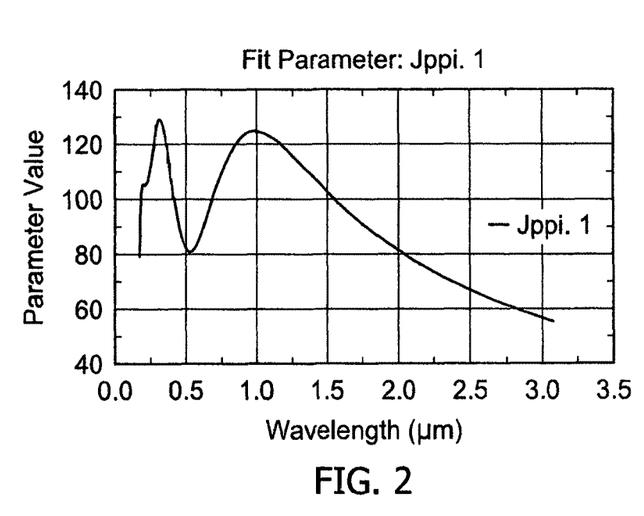
FIG. 2 shows a plot of Retardance vs. Wavelength provided by a present invention retarder system.

Turning now to the Drawings, FIG. 1 shows a plot of Retardance vs. Photon Energy. FIG. 2 shows a plot of this Retardance vs. Wavelength for a demonstrative present invention Retarder. The important thing to note is that at a wavelength of 3 Microns there is significant Retardance capability present, and that the Retardance is within a range between about 0.3 to 3.0+ microns which can be beneficially applied in Ellipsometer and the like systems. FIGS. 1 and 2 demonstrate a primary benefit of the present invention, which has not proven to be possible to achieve when Berek or Non-Berek Retarders are used exclusively in realizing Retarders. This is not to say that, for instance, at least one plate in a present invention Retarder system could not be a of a Berek or Non-Berek-type, only that in the preferred embodiment this is not the case.

Figure 3:
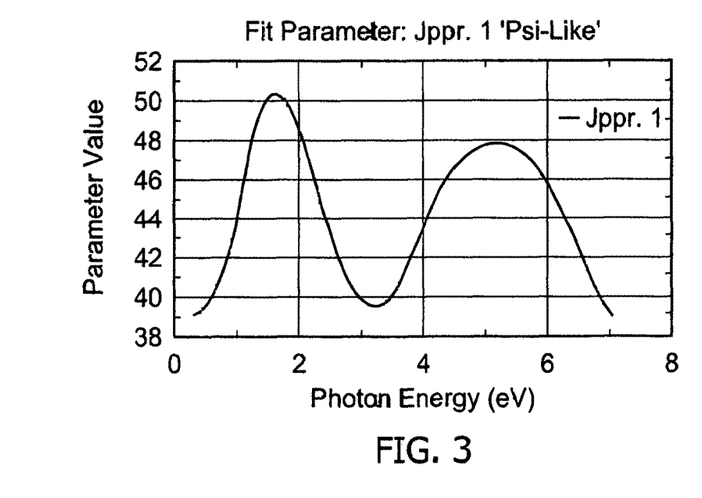
FIG. 3 shows a plot of Psi-like effects vs. Photon energy provided by a present invention retarder system.

FIG. 3 shows a plot of Psi-like effects vs. Photon energy for the demonstrative present invention Retarder.

Figure 4:
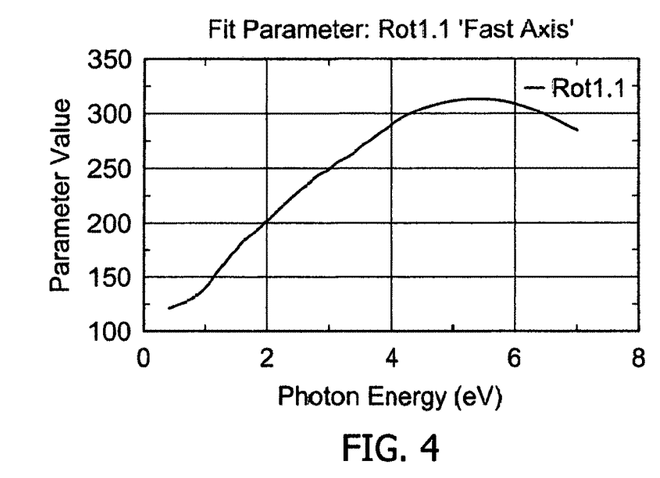
FIG. 4 shows a plot of Fast Axis Rotation vs. Photon Energy provided by a present invention retarder system.

FIG. 4 shows a plot of Fast Axis Rotation vs. Photon Energy for the demonstrative present invention Retarder.

Figure 5:
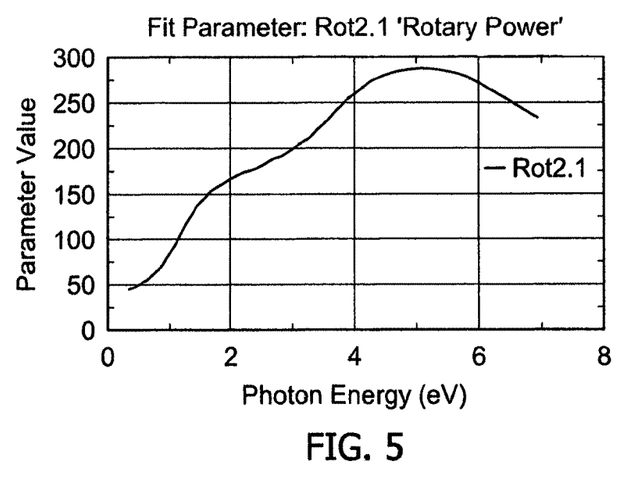
FIG. 5 shows a plot of Rotary Power vs. Photon Energy provided by a present invention retarder system.

FIG. 5 shows a plot of Rotary Power vs. Photon Energy for the demonstrative present invention Retarder.

Figure 6:
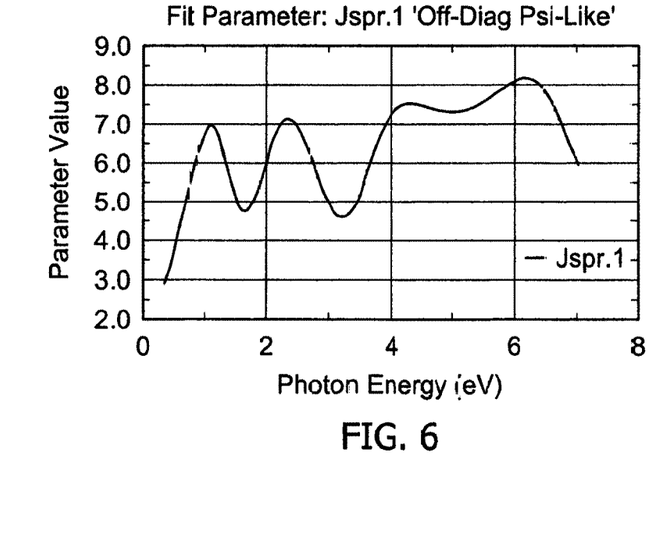
FIG. 6 shows a plot of off-diagonal Psi-like effects vs Photon Energy provided by a present invention retarder system.

FIG. 6 shows a plot of off-diagonal Psi-like effects vs Photon Energy for the demonstrative present invention Retarder.

Figure 7:
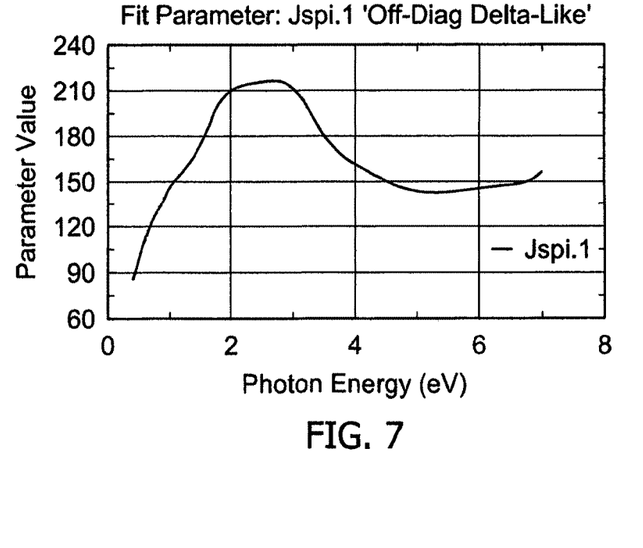
FIG. 7 shows a plot of off-diagonal Delta-like effects vs Photon Energy provided by a present invention retarder system.

FIG. 7 shows a plot of off-diagonal Delta-like effects vs Photon Energy for the demonstrative present invention Retarder.

Figure 8:
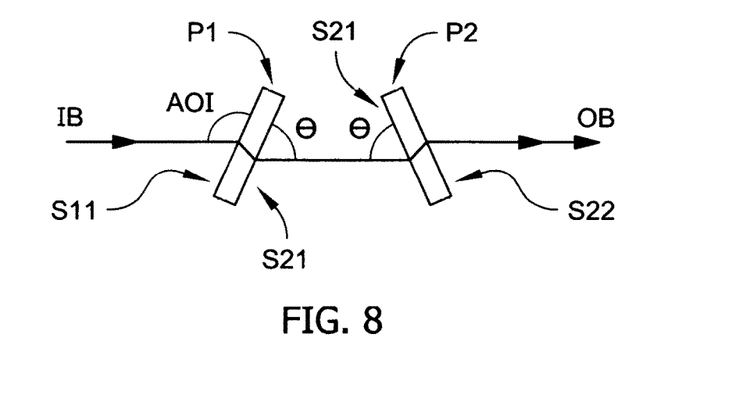
FIG. 8 shows a single pair of Plates (P1) P2) present invention retarder system.

FIG. 8 shows a one pair of Plates (P1) P2) present invention retarder system in which Plate (P1) has parallel Sides (S1) and (S12).

Figure 9:
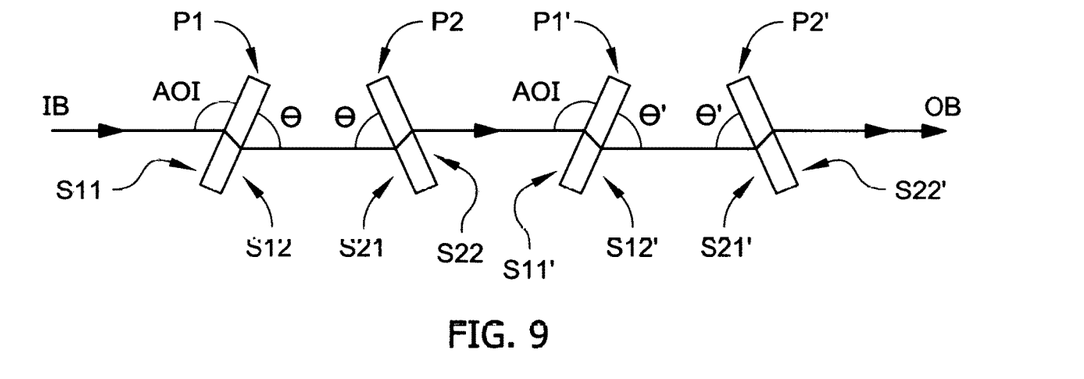
FIG. 9 shows a two pair of Plates (P1) (P2) and (P1') (P2') present invention retarder system.

FIG. 9 shows a two pair of Plates (P1) (P2) and (P1') (P2') present invention retarder system. Plate (P1) has parallel Sides (S11) and (S12) and Plate 2 has Sides (S21) and (S22). Plate (P1') has parallel Sides (S11') and (S12') and Plate (P2') has parallel Sides (S21') and (S22'). It is noted that angles Theta (θ) and (θ)' can be different. That is one pair of Plates (P1) and (P2) can be tipped with respect to one another at angle (θ) and Plates (P1') and P2)' at angle (θ)'.

Figure 10A:
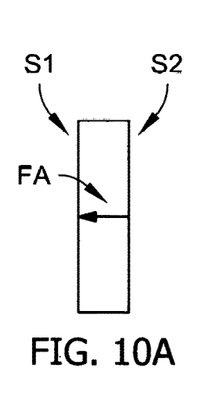
FIG. 10a shows a demonstrative Berek-type Retarder Fast Axis (FA).

FIG. 10A shows a demonstrative Berek-type Retarder Fast Axis (FA) perpendicular to the parallel Sides (S1) and (S2).

Figure 10B:
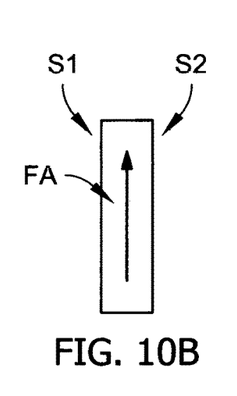
FIG. 10B shows a demonstrative Non-Berek-type Retarder Fast Axis (FA).

FIG. 10B shows a demonstrative Non-Berek-type Retarder Fast Axis (FA) parallel to the parallel sides (S1) dud (S2).

Figure 10C:
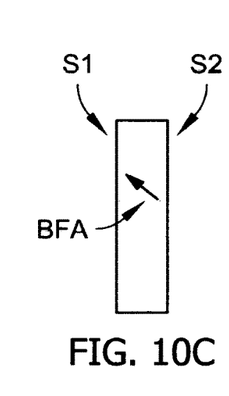
FIGS. 10C and 10D show demonstrative Biased Fast Axes (BFA).
Figure 10D:
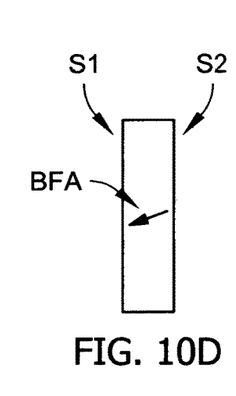

FIGS. 10C and 10D show demonstrative Biased Fast Axes (BFA). Note, any Fast Axis other than as shown in FIGS. 10A and 10B is a Biased Fast Axis (BFA) to the parallel Sides (S1) and (S2).

Note, when rotating, a present invention Retarder rotates about the locus of the Input Beam (IB), which forms an Angle-of-Incidence (AOI) to the first side (S11) of the first Plate (P1), and Output Beam (OB) which exits the second side of the second plate in the second (P2) of said at least one pair of plates, or the second Plate (P2') in a second pair of Plates ((P1') (P2'), which Input (IB) and Output (OB) beams are substantially co-linear.

It is also within the scope of the present invention to have one or more Berek or Non-Berek-type Plates involved in a FIG. 8 or 9 configuration. However, at least one, (and preferably all), Plate having a Biased Fast Axis Plate must be present at a (P1), (P2), (P1') or (P2') location in FIG. 8 or 9. Further, angles (Θ) and (Θ') are indicated in FIGS. 8 and 9 to show how an electromagnetic beam approaches the first sides of the various Plates (P1), (P2), (P1') or (P2'). Note that (Θ) and (Θ') can be the same, or different.

Figure 11A:
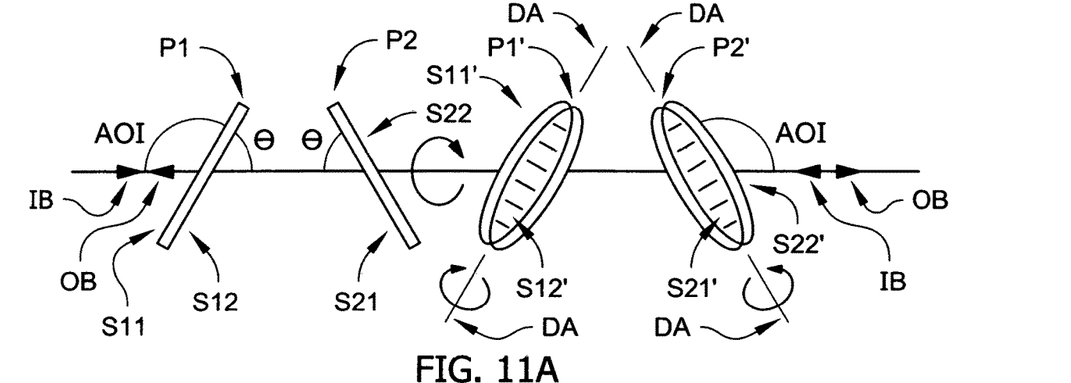
FIG. 11A shows a present invention retarder system, similar to that in FIG. 9, comprising two pair of Plates (P1) (P2) and (P1') (P2'), with the difference being that Plates (P1') (P2') are rotated.

FIG. 11A shows a Present Invention retarder system much as in FIG. 9, which likewise comprises two pairs of Plates, (P1) (P2) and (P1') (P2'), with the difference being that Plates (P1') (P2') are rotated in a way that makes their sides (S12') and (S21') visible. Note that the rotation between Plate Pairs is relative and that similar Retardation effects could be achieved if Plates (P1) and (P2) were rotated instead of or along with Plates (P1') and (P2'), although then it is possible that sides (S11) (S22) or (S21) and (S21) would become visible in FIG. 11A. Further note that Plates (P1) and (P2) are tipped at Supplemental angles of (AOI) and a counter-clockwise rotated angle (θ), respectively, with respect to the Beam trajectory between its Input IB) and Output (OB), as again is the case in FIG. 9. FIG. 11A' is included to demonstrate that the Plates (P1') and (P2') in FIG. 11A can be rotated about the Beam of Electromagnetic Radiation to make sides (S12') and (S21') visible as viewed in FIG. 11A. FIG. 11a' is to be interpreted as showing Plates (P1) and (P2) being present in a vertically oriented plane, and Plates (P1') and (P2') in a horizontally oriented plane. Note that Plates (P1') and (P2') can be present in a plane between vertical and horizontal as well, and be within the scope of the Present Invention. Again, such a rotation of Plates (P1') and (P2') in FIG. 11A' makes the Sides (S12') and (S21') visible in FIG. 11A. FIG. 11A" demonstrates that Diametric-like axes (DA) can be similarly, (ie. the same Diameter-like (DA) orientation applies to both Plates (P1') and (P2')), assigned to Plates (P1') and (P2'), and one thereof rotated clockwise and the other counter-clockwise thereabout to achieve a result, which viewed as in FIG. 11A, also exposes the sides (S12') and S21')). That is, Sides (S12') and (S21') become visible in the FIG. 11A frontal elevation view by either of two rotation types, (eg. FIGS. 11A' and 11A"). For clarity, the two plates in a FIG. 11A" pair each have similarly defined Diametric-like axes (DA) assigned thereto, and one of said plates is rotated thereabout by a selected number of degrees in a clockwise direction, and the other thereof is rotated thereabout by said selected number of degrees in a counter-clockwise direction. The Diametric-like axes (DA) can be oriented along any Diameter-like (DA) direction. Note also that FIG. 11A" indicates that the Plates (P1') and (P2') can be oriented vertically without any tilt, (ie. the (AOI) at the left of FIG. 11A is 90 degrees and in that case Plates (P1') and (P2') are parallel to one another. Such an orientation can be considered as what results when angle (AOI) at the left side of FIG. 11A is set to 90 degrees with respect to the trajectory of the Beam, and Plate (P2') is made parallel thereto. Further note that if the rotation directions in FIG. 11A" were reversed for both Plates (P1') and (P2') it would be sides (S11') and (S22') would be visible in FIG. 11A. This is to be considered within the scope of the Present Invention. A combination of the FIGS. 11A' and 11A" type indicated rotations can also be performed and be within the scope of the Present Invention. It is to be understood that what is ultimately important to a practicing a Present Invention Retarder System is the Output Beam (OB) is not deviated or offset from the Input Beam (IB) even when the Retarder System is caused to rotate about the Trajectory of the Beam in use. Any of the Retarder System Plates (P1) and (P2) and (P1') and (P2') can be tipped and/or rotated in any possible manner, if the overall effect is to add retardance to a Beam of electromagnetic radiation passing therethrough over a range of wavelengths, while not entering deviation or offset between an Input (IB) directed thereinto and Output (OB) Beam exiting therefrom.

Figure 11B:
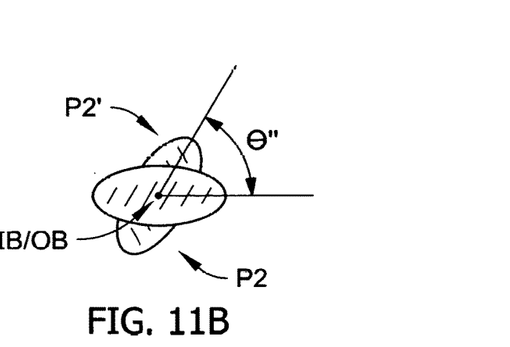
FIG. 11B shows an end-on view looking into and taken along the Beam of Electromagnetic radiation from the right side in FIG. 11A, where Plates (P1') and (P2') have been rotated about the Beam of Electromagnetic Radiation, with respect to Plates (P1) and (P2).

FIG. 11B shows an exemplary end-on view taken looking into the Beam of Electromagnetic radiation from the right side in FIG. 11A, where Plates (P1') and (P2') have been rotated about the Beam of Electromagnetic Radiation about 90 degrees, with respect to Plates (P1) and (P2) by (θ") degrees. Again, rotations are relative and it could be that Plates (P1) and (P2) are rotated instead, or along with Plates (P1') and (P2') to achieve an angle (θ") between the two pairs of Plates, as demonstrated by visible (P2) ad (P2') in FIG. 11B.

Figure 12:
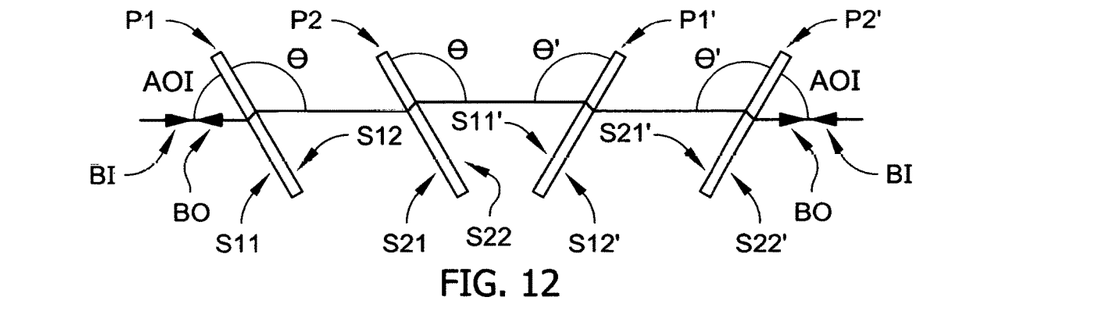
FIG. 12 shows a variation on a FIG. 9 sequence of Plates (P1) (P2) and (P1') (P2'), wherein Plates (P1) and (P2) are oriented with their sides parallel to one another, and Plates (P1') and (P2') are oriented with their sides parallel to one another.

FIG. 12 shows a variation on a FIG. 9 sequence of Plates (P1) (P2) and (P1') (P2'), wherein Plates (P1) and (P2) are oriented with sides (S11) (S12) S21) (S22) intended to be parallel to one another, and Plates (P1') and (P2') are oriented with sides (S11') (S12') (S21') (S22') intended to be parallel to one another. Note that like in FIG. 9 the Output Beam (OB) is non-deviated and not displaced from the Input Beam (IB), although unlike in FIG. 9, each pair of Plates (P1) (P2) and (P1') (P2') does not achieve that on its own. Rather the accumulated offset provided by Plates (P1) and (P2) is offset by Plates (P1') (P2'). The FIG. 12 retarder system then provides that the two plates of each of the first (P1) (P2) and second (P1') (P2') pairs of plates are oriented with their first and second parallel or substantially parallel sides, parallel, or substantially parallel to one another. The two plates of the first pair (P1) (P2) of plates are oriented with respect to the trajectory of the beam at a set angle (AOI), and the two plates of the second (P1') (P2') pair of plates are oriented with respect to the trajectory of the beam at a supplementary angle of (180 degrees—said set angle (AOI)). In FIG. 9 the first and second Plates of a pair thereof, (ie P1 and P2 or P1' and P2'), are oriented at a Set Angle (AOI) with respect to the trajectory of the Beam, and a Supplementary set angle of (180 degrees—AOI) respectively, in each pair individually. Note that in FIG. 11A the Input (IB) and Output (OB) Beams can be on either the right or left in the Figure. This can also be done in the FIG. 9 system and anywhere there is symmetry.

Finally, for insight, it is noted that true Berek-type retarders, (ie. wherein the fast axis is perpendicular to the face of the plate, see FIG. 10a), are used by tipping the plate a little, so the angle the beam makes with the fast axis is very small. The causes the dispersion angle range for wavelengths to also be also small. The present invention positions the fast axis in the plate as in FIGS. 10c and 10d, such that good retardance is achieved at a larger range of plate tip angles, as the fast axis thereof is more aligned with an average internal angle of a beam in the plate. This allows for wavelength dispersion tailoring to provide a spectrum that yields a more ideal range of values. Note, Θ and Θ' in typical present invention use will typically be smaller, rather than larger as shown in FIGS. 8 and 9. That is, the plate (P1, P1', P2, P2') tips can be larger than if a FIG. 10*a* true Berek plate were used, which enables achieving better wavelength dispersion.

Having hereby disclosed the subject matter of the demonstrative present invention, it should be obvious that many modifications, substitutions, and variations of the demonstrative present invention are possible in view of the teachings. It is therefore to be understood that the invention may be practiced other than as specifically described, and should be limited in its breadth and scope only by the Claims.

I claim:

1. A retarder plate having first and second parallel or substantially parallel sides, said retarder plate having a fast axis which is neither parallel to, or perpendicular to said first and second sides, but rather is at a biased angle between perpendicular and parallel thereto, wherein said first and second sides are identified by, during use, receiving and exiting a beam of electromagnetic radiation, respectively.

2. A retarder system comprising sequentially, at least one pair of plates, each said plate having first (S1) and second (S2) parallel or substantially parallel sides and a fast axis, said plates being oriented with respect to one another such that an incident beam of electromagnetic radiation entering the first side (S1) of the first plate exits the second side (S2) of said last plate along a trajectory that is essentially non-deviated and not offset from the incident beam that entered the first side (S1) of said first plate, said retarder system being characterized in that the fast axis of at least one plate is neither perpendicular to, nor parallel to said plate sides (S1) (S2), but rather is at a biased angle between perpendicular and parallel thereto;

wherein said first and second plate sides (S1) (S2) are identified by, during use, receiving and exiting a beam of electromagnetic radiation, respectively;

such that in use a phase angle between orthogonal components of said electromagnetic beam entering the first side of the first plate, is changed by passing through said at least one pair of plates.

3. A retarder system as in claim 2, in which there are sequentially two pairs of plates.

4. A retarder system as in claim 3, wherein the plates each have similarly defined reference axes, and in which, as viewed along a path of the incident beam of electromagnetic radiation entering the first side of the first plate, the reference axes of the first pair of plates and the second pair of plates are lined up.

5. A retarder system as in claim 3, wherein the plates each have similarly defined reference axes, and in which, as viewed along a path of the incident beam of electromagnetic radiation entering the first side of the first plate, the reference axes of the second pair of plates is rotated around the trajectory of said beam, with respect to the reference axes of the first pair of plates by a rotational angle.

6. A retarder system as in claim 5, wherein the rotational angle is in the range of zero to ninety degrees.

7. A retarder system as in claim 5, wherein the rotational angle is ninety degrees.

8. A retarder system as in claim 3, wherein the two plates of the first pair of plates are oriented one with its first and second parallel or substantially parallel sides at a first set angle with respect to the trajectory of the beam, and the other at a supplementary set angle of 180 degrees—said first set angle with resect to the trajectory of the beam, respectively; and wherein the two plates of the second pair of plates are oriented one with its first and second parallel or substantially parallel sides at a second set angle with resect to the trajectory of the beam, and the other at a supplementary angle of 180 degrees—said second set angle with resect to the trajectory of the beam, respectively.

9. A retarder system as in claim 8, wherein the first and second set angles are the same.

10. A retarder system as in claim 3, wherein the two plates of each of the first and second pairs of plates are oriented with their first and second parallel or substantially parallel sides, parallel, or substantially parallel to one another, and wherein the two plates of the first pair of plates are oriented with respect to the trajectory of the beam at a set angle, and the two plates of the second pair of plates are oriented with respect to the trajectory of the beam at a supplementary angle of 180 degrees—said set angle.

11. A retarder system as in claim 2, wherein the two plates in a pair thereof each have similarly defined diametric-like axes assigned thereto, and one of said plates is rotated thereabout by a selected number of degrees in a clockwise direction, and the other thereof is rotated thereabout by said selected number of degrees in a counter-clockwise direction.

12. A method of providing a retardance to a beam of electromagnetic radiation over a range of wavelengths comprising the steps of:

a) providing a retarder system comprising sequentially, at least one pair of plates, each said plate having first and second parallel or substantially parallel sides and a fast axis, said plates being oriented with respect to one another such that an incident beam of electromagnetic radiation entering the first side of the first plate exits the second side of said last plate along a trajectory that is essentially non-deviated and not offset from the incident beam that entered the first side of said first plate, said retarder system being characterized in that the fast axis of at least one plate is neither perpendicular to, nor parallel to said plate sides, but rather is at a biased angle between perpendicular and parallel thereto;

b) entering the beam of electromagnetic radiation into the first side of the first plate;

c) monitoring the beam of electromagnetic radiation exiting the second side of the last plate;

the result being that, in use, a phase angle between orthogonal components of said electromagnetic beam entering the first side of the first plate, is changed by passing through said at least one pair of plates.

13. A method as in claim 12, in which the retarder system is caused to, in use, rotate about the trajectory of the beam which is undeviated and not displaced between input to the first side of the first plate and the output from the second side of said last plate.

14. A retarder system comprising sequentially, at least two pair of plates, each said plate having first and second parallel or substantially parallel sides and a fast axis, said plates being oriented with respect to one another such that an incident beam of electromagnetic radiation entering the first side of the first plate exits the second side of said last plate along a trajectory that is essentially non-deviated and not offset from the incident beam that entered the first side of said first Plate, said retarder system being characterized in that the fast axis of at least one plate is neither perpendicular to, nor parallel to said plate sides, but rather is at a biased angle between perpendicular and parallel thereto;

such that in use a phase angle between orthogonal components of said electromagnetic beam entering the first side of the first plate, is changed by passing through said at least two pair of plates;

wherein the plates each have similarly defined reference axes, and in which, as viewed along the path of the beam, the reference axes of the second pair of plates is rotated around the trajectory of said beam, with respect to the reference axes of the first pair of plates by a rotational angle.

15. A retarder system as in claim 14, wherein the rotational angle is in the range of zero to ninety degrees.

16. A retarder system as in claim 14, wherein the rotational angle is ninety degrees.

17. A retarder system as in claim 14, wherein the two plates of the first pair of plates are oriented one with its first and second parallel or substantially parallel sides at a first set angle with respect to the trajectory of the beam, and the other at a supplementary set angle of 180 degrees—said first set angle with resect to the trajectory of the beam, respectively; and wherein the two plates of the second pair of plates are oriented one with its first and second parallel or substantially parallel sides at a second set angle with resect to the trajectory of the beam, and the other at a supplementary angle of 180 degrees—said second set angle with resect to the trajectory of the beam, respectively.

18. A retarder system as in claim 17, wherein the first and second set angles are the same.

19. A retarder system as in claim 14, wherein the two plates of each of the first and second pairs of plates are oriented with their first and second parallel or substantially parallel sides, parallel, or substantially parallel to one another, and wherein the two plates of the first pair of plates are oriented with respect to the trajectory of the beam at a set angle, and the two plates of the second pair of plates are oriented with respect to the trajectory of the beam at a supplementary angle of 180 degrees—said set angle.

* * * * *